United States Patent
Wang

(10) Patent No.: US 9,341,195 B2
(45) Date of Patent: May 17, 2016

(54) CENTRIFUGAL FAN MODULE AND ELECTRONIC DEVICE USING THE CENTRIFUGAL FAN MODULE

(71) Applicant: ASUSTeK COMPUTER INC., Taipei (TW)

(72) Inventor: Cheng-Yu Wang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 82 days.

(21) Appl. No.: 14/320,574

(22) Filed: Jun. 30, 2014

(65) Prior Publication Data

US 2015/0016061 A1 Jan. 15, 2015

(30) Foreign Application Priority Data

Jul. 9, 2013 (CN) .......................... 2013 1 0285384

(51) Int. Cl.
| | |
|---|---|
| F04D 29/70 | (2006.01) |
| H05K 7/20 | (2006.01) |
| F04D 17/08 | (2006.01) |
| G06F 1/20 | (2006.01) |
| F04D 17/16 | (2006.01) |
| F04D 29/42 | (2006.01) |
| F04D 29/58 | (2006.01) |

(52) U.S. Cl.
CPC .............. *F04D 29/703* (2013.01); *F04D 17/16* (2013.01); *F04D 29/4226* (2013.01); *F04D 29/582* (2013.01); *G06F 1/203* (2013.01)

(58) Field of Classification Search
CPC ....... G06F 1/203; G06F 1/1658; G06F 1/206; H05K 2201/09063; H05K 13/0023; H05K 1/0201; H05K 7/20172; H05K 7/20154
USPC .......... 361/697, 600, 679.46, 679.48, 679.02, 361/679.47, 679.54, 688, 710, 714, 728, 361/752, 807, 809, 810; 165/80.3, 104.33
See application file for complete search history.

(56) References Cited

U.S. PATENT DOCUMENTS

| | | | | |
|---|---|---|---|---|
| 7,802,617 | B2 * | 9/2010 | Hwang .................. | F04D 29/422 165/122 |
| 8,534,998 | B2 * | 9/2013 | Liang .................. | F04D 25/0613 415/182.1 |

(Continued)

FOREIGN PATENT DOCUMENTS

| | | |
|---|---|---|
| CN | 102316704 A | 1/2012 |
| CN | 202117992 U | 1/2012 |

*Primary Examiner* — Robert J Hoffberg
*Assistant Examiner* — Michael Matey
(74) *Attorney, Agent, or Firm* — CKC & Partners Co., Ltd.

(57) ABSTRACT

A centrifugal fan module comprising a fan housing and an impeller is provided. The fan housing includes an air inlet and a sidewall. The sidewall is pivotally disposed in the fan housing to rotate in the rotational direction relative to the fan housing. A tongue portion is formed between the sidewall and the impeller, a pressurized region is formed from the tongue portion along the rotational direction to the air outlet, the pressurized region includes a strong airflow region and the dust-discharging hole is in the strong airflow region.

14 Claims, 5 Drawing Sheets

(56) References Cited

U.S. PATENT DOCUMENTS

| | | | |
|---|---|---|---|
| 2008/0219838 A1* | 9/2008 | Kusano | F01D 1/02 415/203 |
| 2010/0226766 A1* | 9/2010 | Eguchi | F04D 29/422 415/206 |
| 2010/0275560 A1* | 11/2010 | Chen | F04D 25/08 55/385.7 |
| 2011/0097195 A1* | 4/2011 | Horng | F04D 27/004 415/121.2 |
| 2011/0267777 A1* | 11/2011 | Oike | G06F 1/203 361/697 |
| 2012/0114512 A1* | 5/2012 | Lofy | F04D 29/4226 417/410.1 |
| 2012/0162905 A1 | 6/2012 | Kim et al. | |
| 2013/0017078 A1* | 1/2013 | Armstrong | F04D 29/162 415/204 |
| 2013/0021751 A1 | 1/2013 | Shiraga et al. | |
| 2013/0121818 A1* | 5/2013 | Shichiken | F04D 17/16 415/204 |
| 2013/0177402 A1* | 7/2013 | Horng | F04D 17/16 415/121.2 |

* cited by examiner

CENTRIFUGAL FAN MODULE AND ELECTRONIC DEVICE USING THE CENTRIFUGAL FAN MODULE

CROSS-REFERENCE TO RELATED APPLICATION

This application claims the priority benefit of China application serial No. 201310285384.1, filed on Jul. 9, 2013. The entirety of the above-mentioned patent application is hereby incorporated by reference herein and made a part of specification.

BACKGROUND OF THE INVENTION

1. Field of the Invention

The disclosure relates to a centrifugal fan module and, more particularly, to a centrifugal fan module applied to an electronic device.

2. Description of the Related Art

Nowadays, various kinds of thin and stylish portable electronic devices have gradually become the main communication tools in people's life. As the miniaturization and high performance trend of the electronic device, the heat dissipating element in the electronic device should be miniaturized due to the limited inner space. For example, the centrifugal fan module is one of the most common active heat dissipating elements in a notebook computer.

However, the dust accumulated within the housing of the notebook computer often affects the overall efficiency of the heat dissipation. Thus, the dust is drawn into the host casing through the inlet hole of the host casing or the gap of input/output (I/O) device, and when the dust is discharged from the exhaust holes of the host casing, most of the dust will accumulate at the heat dissipating fins of the air outlet of the centrifugal fan module, which makes the exhaust air rate reduce, the heat dissipation of the notebook computer is affected, thus resulting the temperature of the system increases and the noise is too loud.

BRIEF SUMMARY OF THE INVENTION

A centrifugal fan comprising a fan housing and an impeller is provided. The fan housing includes an air outlet and a sidewall. The sidewall includes a dust-discharging hole. The impeller is pivotally disposed in the fan housing to rotate along a rotational direction relative to the fan housing. A tongue portion is formed between the sidewall and impeller. A pressurized region is formed from the tongue portion along the rotational direction to the air outlet. The pressurized, region includes a strong airflow region, and the dust-discharging, hole is in the strong airflow region.

An electronic device comprising a host casing, a centrifugal fan module and a heat dissipating fin group is further provided. The host casing includes an upper casing and a lower casing. The upper casing and the lower casing form au accommodation space. The lower casing has a plurality of exhaust holes. The centrifugal fan module includes a fan housing and an impeller. The fan housing includes an air outlet and includes a sidewall. The sidewall includes a dust-discharging hole. The impeller is pivotally disposed in the fan housing to rotate along a rotational direction relative to the fan housing. A tongue portion is formed between the sidewall and the impeller. A pressurized region is formed from the tongue portion along the rotational direction to the air outlet. The pressurized region includes a strong airflow region, and the dust-discharging hole is in the strong airflow region. The heat dissipating fin group is disposed between the exhaust holes and the air outlet.

In conclusion, the centrifugal fan module provides an active dust discharging design, a dust-discharging hole is formed at the sidewall of the fan housing, and the dust-discharging hole is in the strong airflow region (that is, the high pressure region) of the fan housing. Therefore, via the centrifugal force generated by the rotation of the impeller in the strong airflow region, the dust can be forced to throw to the dust-discharging flow channel outside the fan housing via the dust-discharging hole, consequently, the effect of active dust discharge can be achieved. Thereby, after the centrifugal fan module in embodiments is used in the electronic device for a long time, almost no dust is accumulated at the air outlet of the fan housing. As a result, the fan flow resistance increases, the outlet air flow decreases and the effect of the heat dissipation are avoided.

DETAILED DESCRIPTION OF THE EMBODIMENTS

The embodiments in the application are illustrated with relating figures, and for clarity of the illustration, the details in the embodiments are illustrated in the following description. However, it should be recognized that the details in the embodiments are not intended to limit the scope of the application. That means, the details in the embodiments may be not necessary to this application. In addition, to simplify the figures, some known conventional structure and elements in the figures will be shown ma simplified illustration way.

Figure 1:
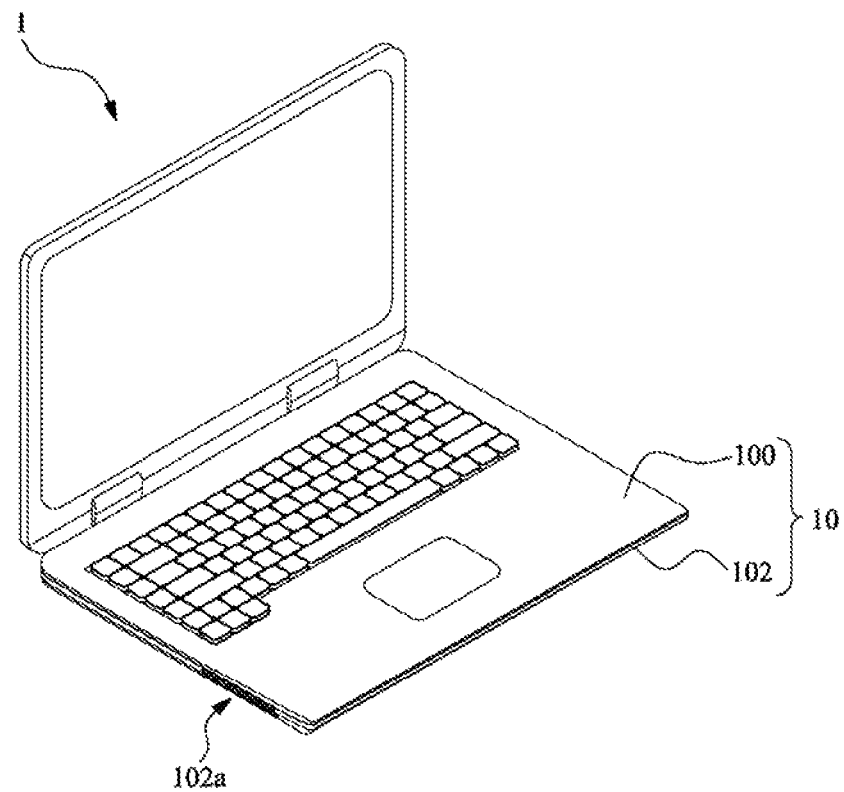
FIG. 1 is a schematic diagram showing an electronic device in one embodiment of the application.
Figure 2:
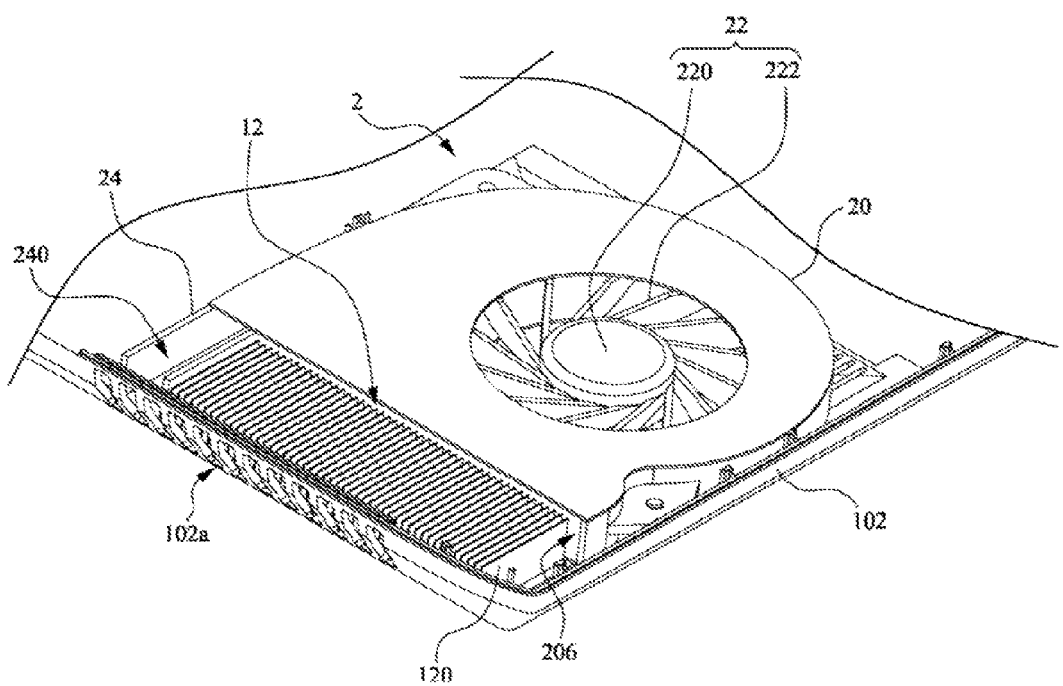
FIG. 2 is an enlarge view of part of the electronic device in FIG. 1 whose upper casing is removed.

Please refer to FIG. 1 and FIG. 2. FIG. 1 is a perspective view of an electronic device in one embodiment of the application. FIG. 2 is an enlarge view of part of the electronic device in FIG. 1, in which the upper casing is removed. In the embodiment, a notebook computer is taken as an example to illustrate the electronic device 1 of this embodiment, which is not limited herein. The electronic device 1 using the centrifugal fan module 2 may be any electronic device with an internal heat source inside. The centrifugal fan module 2 can be applied as long as the inside of the electronic device 1 has the heat dissipation requirement.

As shown in FIG. 1 and FIG. 2, in this embodiment, the electronic device 1 includes a host casing 10. The host casing 10 of the electronic device 1 includes an upper casing 100 and a lower casing 102. The upper casing 100 and the lower casing 102 form an accommodation space. The centrifugal fan module 2 is disposed in the host casing 10. The lower casing 102 of the host casing 10 has a plurality of exhaust holes 102a. The electronic device 1 in the host casing 10 further includes a heat dissipating fin module 12. The heat dissipating fin module 12 is a stack structure formed by a plurality of heat dissipating fins 120, and it is disposed between the exhaust holes 102a of the lower casing 102 and the an outlet 206 of the centrifugal fan module 2. After the air flow generated by the centrifugal fan module 2 blows through the air outlet 206, the air flow first passes through the heat dissipating fin module 12 for the heat exchange, and then it passes through the exhaust holes 102a of the lower casing 102 to exhaust out the host casing 10.

Figure 3A:
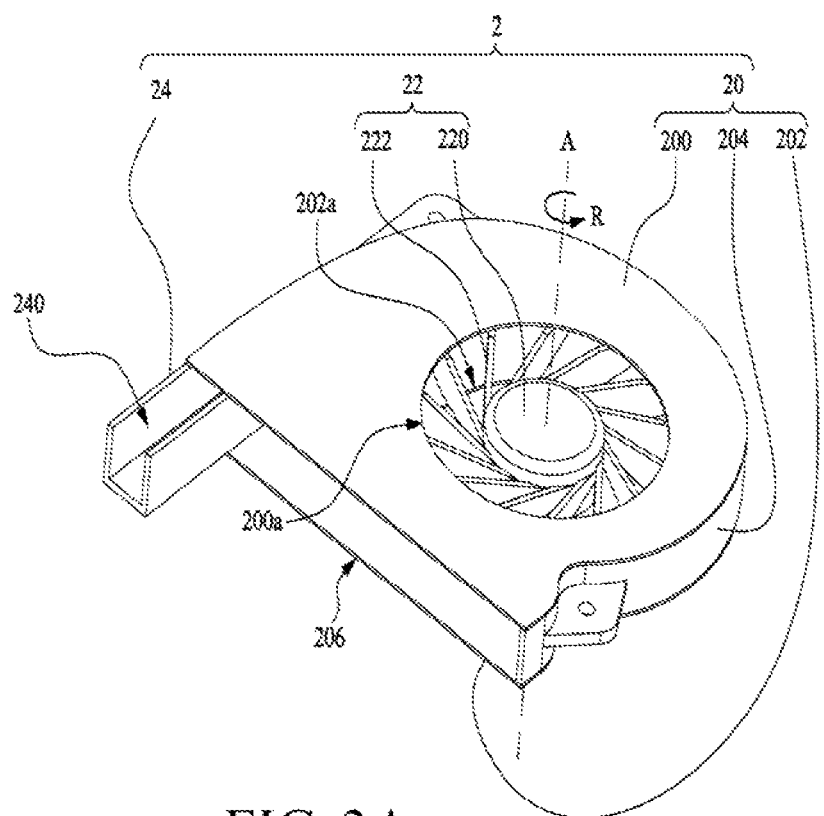
FIG. 3A is a perspective view showing assembly of the centrifugal fan module shown in the FIG. 2.
Figure 3B:
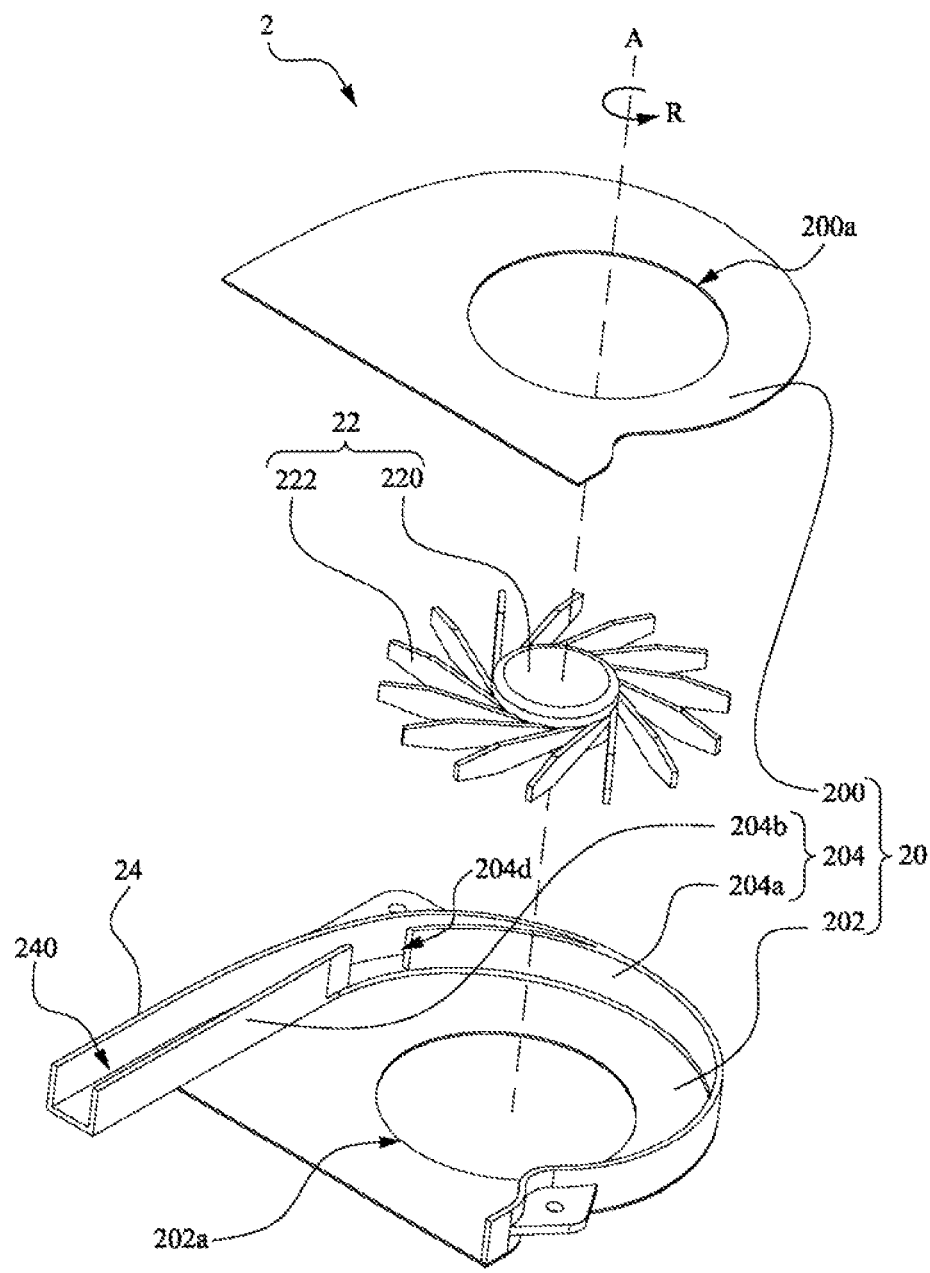
FIG. 3B is a perspective exploded view of the centrifugal fan module shown in FIG. 3A.

Please refer to FIG. 3A and FIG. 3B. FIG. 3A is a perspective view showing assembly of the centrifugal fan module shown in the FIG. 2. FIG. 3B is a perspective exploded view of the centrifugal fan module shown in FIG. 3A.

As shown in FIG. 3A and FIG. 3B, in this embodiment, a centrifugal fan module 2 includes a fan housing 20 and an impeller 22. The impeller 22 is pivotally disposed in the fan housing 20 to rotate relative to the fan housing 20 along a rotational direction R. The impeller 22 includes a hub 220 and a plurality of vanes 222. The vanes 222 are connected to the outer edge of the hub 220 in a radial arrangement.

The fan housing 20 of the centrifugal fan module 2 includes an upper casing 200, a lower casing 202 and a sidewall 204. The sidewall 204 of the fan housing 20 is connected between the upper casing 200 and the lower casing 202 to form the air outlet 206 and an accommodation space for receiving the impeller 22. The upper casing 200 of the fan housing 20 includes an upper air inlet 200a, and the lower casing 202 includes a lower air inlet 202a. When the impeller 22 rotates in the fan housing 20 along the rotation direction R relative to the fin housing 20, the air outside the fan housing 20 would be drawn into the fan housing 20 via the upper air inlet 200a and the lower air inlet 202a and exhausted out through the air outlet 206.

Figure 4:
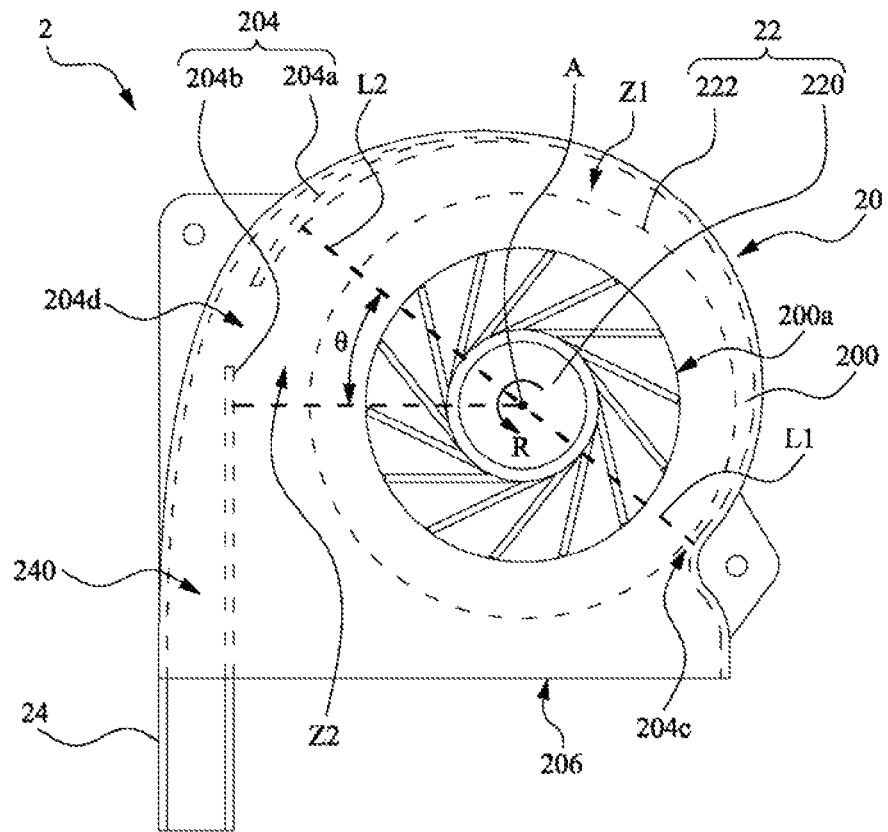
FIG. 4 is a top perspective view of the centrifugal fan module shown in FIG. 3A.

Please refer to FIG. 4, it is a top perspective view of the centrifugal fan module shown in FIG. 3A.

As shown in FIG. 4, in this embodiment, the sidewall 204 of the fan housing 20 includes a dust-discharging hole 204d. A tongue portion 204c is formed between the sidewall 204 and the hub 220. The tongue portion 204c is located in the place where the sidewall 204 is closest to the impeller 22. The distance between the sidewalls 204 and the hub 220 increases gradually from the tongue portion 204c along the rotation direction R to the air outlet 206. After the air outside the fan housing 20 is drawn into the fan housing 20 via the upper air inlet 200a and the lower air inlet 202a, the gradually enlarged structure between the sidewall 204 and the hub 220 makes the wind resistance of the air flow decrease gradually (the static pressure decreases therewith), thereby the wind, velocity of the air flow increases gradually (the dynamic pressure increases herewith). Thus, a pressurized region Z1 is formed (that is, the dynamic pressure increased region) between the sidewall 204 and the hub 220 from the tongue portion 204c along the rotation direction R to the air outlet 206.

The strong airflow region Z2 (that is, a high pressure region of the air flow) with the highest wind speed is at the pressurized region Z1 of the centrifugal fan module and the dust-discharging hole 204d of the sidewall 204 is in the strong airflow region Z2. Thus, the centrifugal force generated by the rotation of the impeller 22 in a strong airflow region Z2, the dust can be discharged via the dust-discharging hole 204d of the sidewall 204 to outside the fan housing 20.

In detail, as shown in FIG. 4, a first straight line L1 (as indicated by the bold dotted line) is formed between the tongue portion 204c and the axis A of the impeller 22, and it extends horizontally to form a second straight line L2 (as indicated by the bold dotted line) to the sidewall 204, that is, the position of the tongue portion 204c rotating by 180 degrees along the rotation direction R. The region between the second straight line L2 and a line which is formed by rotating a predetermined angle θ along the direction R is the strong airflow region Z2. In this embodiment, the predetermined angle θ is 40 to 50 degrees that is, the strong airflow region Z2 is located between the first line L1 rotated by 180 degrees to the first line L1 rotated by 220 to 230 degrees along the rotation direction R. However, the predetermined angle θ can be adjusted according to practical requirements, which is not limited herein.

Further, as shown in FIG. 3A and FIG. 3B, in this embodiment, the sidewall 204 of the fan housing 20 includes a first wall portion 204a and a second wall portion 204b. The first wall portion 204a and the second wall portion 204b are connected with the upper casing 200 and the lower casing 202 to form the air outlet 206 and an accommodation space for receiving the impeller 22. A tongue portion 204c is formed between the first wall portion 204a and the hub 220. The dust-discharging hole 204d is between the first wall portion 204a and the second wall portion 204b. The second wall portion 204b is perpendicular to the air outlet 206.

As shown in FIG. 3A and FIG. 3B, in this embodiment, the centrifugal fan module 2 further includes an air guiding structure 24. The air guiding structure 24 is outside the fan housing 20 and is connected with sidewall 204. A dust-discharging flow channel 240 is formed between the air guiding structure 24 and the sidewall 204. The flow channel 240 is connected with the dust-discharging hole 204d. As shown in FIG. 2, the air guiding structure 24 and the sidewall 204 guild the dust-discharging flow channel 240 to the exhaust holes 102a of the lower casing 102. As a result, after the dust is discharged through the dust-discharging hole 204d to outside the fan housing 20, the dust continues to flow along the dust-discharging flow channel 240 between the air guiding structure 24 and the sidewall 204, and then it is discharged through the exhaust holes 102a of the lower casing 102 to outside the host casing 10.

However, the dust-discharging flow channel 240 also can be formed by the air guiding structure 24 independently, and lead to the other default dust-discharging part of the host casing 10.

Although the disclosure has been described in considerable detail with reference to certain preferred embodiments thereof, the disclosure is not for limiting the scope. Persons having ordinary skill in the art may make various modifications and changes without departing from the spirit and the scope of the disclosure. Therefore, the scope of the appended claims should not be limited to the description of the preferred embodiments described above.

What is claimed is:

1. A centrifugal fan module, comprising:

A fan housing including an air outlet and a sidewall, wherein the sidewall includes a dust-discharging hole;

an impeller pivotally disposed in the fan housing to rotate along a rotational direction relative to the fan housing; and an air guiding structure formed as a wall having first and second ends, the first end being connected to the sidewall;

wherein a tongue portion is formed between the sidewall and the impeller, the impeller being between the tongue portion and the dust-discharging hole;

wherein a dust-discharging flow channel is formed between the air guiding structure and the sidewall, the dust-discharging flow channel having an exit end where air exits therefrom corresponding to the second end of the air guiding structure, wherein the exit end of the dust-discharging flow channel is adjacent to the air outlet of the fan housing and on the same side of the fan housing as the air outlet.

2. The centrifugal fan module according to claim 1, wherein a pressurized region is formed from the tongue portion along the rotational direction to the air outlet, the pressurized region includes a strong airflow region, and the dust-discharging hole is in the strong airflow region, the strong airflow region is an area between a position that the tongue portion rotated by 180 degrees along the rotation direction and the position that the tongue portion further rotated by a predetermined angle θ.

3. The centrifugal fan module according to claim 2, wherein the predetermined angle θ is 40 to 50 degrees.

4. The centrifugal fan module according to claim 1, wherein the sidewall includes a first wall portion and a second wall portion, the tongue portion is between the first wall portion and the impeller, the dust-discharging hole is between the first wall portion and the second wall portion.

5. The centrifugal fan module according to claim 1, wherein the dust-discharging flow channel is outside the fan housing and connected with the dust-discharging hole.

6. The centrifugal fan module according to claim 5, wherein the centrifugal fan module further includes an air guiding structure, the air guiding structure is outside the fan housing and connected with the sidewall, and the dust-discharging flow channel is formed between the air guiding structure and the sidewall.

7. The centrifugal fan module according to claim 1, wherein the air guiding structure gradually separates from the sidewall for a distance in the rotational direction of the impeller starting from the first end, and subsequently maintains a roughly fixed distance from the sidewall after said distance to the second end of the air guiding structure.

8. The centrifugal fan module according to claim 7, wherein the dust-discharging hole of the sidewall is formed in proximity to where the first end of the wall of the air guiding structure is connected to the sidewall and at a location wherein the air guiding structure is gradually separating from the sidewall.

9. The centrifugal fan module according to claim 7, wherein an imaginary line drawn from an axis of the impeller to a nearest part of the air outlet of the fan housing is roughly parallel to a line drawn through a center of the dust-discharging flow channel at an area of the dust-discharging flow channel corresponding to where the air guiding structure maintains the roughly fixed distance from the sidewall.

10. The centrifugal fan module according to claim 7, wherein the rotational direction of the impeller is the direction along which the impeller normally rotates when performing as cooling function.

11. An electronic device comprising:
a host casing including an upper casing and a lower casing that formed an accommodation space, the lower casing includes a plurality of exhaust holes; and
a centrifugal fan module, comprising:
a fan housing including an air outlet and a sidewall, wherein the sidewall includes a dust-discharging hole;
an impeller pivotally disposed in the fan housing to rotate along a rotational direction relative to the fan housing, wherein a tongue portion is formed between the sidewall and the impeller, the impeller being between the tongue portion and the dust-discharging hole; and
an air guiding structure formed as a wall having first and second ends, the first end being connected to the sidewall; and
a heat dissipating fin module disposed between the exhaust holes and the air outlet;
wherein a dust-discharging flow channel is formed between the air guiding structure and the sidewall, the dust-discharging flow channel having an exit end where air exits therefrom corresponding to the second end of the air guiding structure, wherein the exit end of the dust-discharging flow channel is adjacent to the air outlet of the fan housing and on the same side of the fan housing as the air outlet.

12. The electronic device according to claim 11, wherein the sidewall includes a first wall portion and a second wall portion, the tongue portion is between the first wall portion and the impeller, and the dust-discharging hole is between the first wall portion and the second wall portion.

13. The electronic device according to claim 11, wherein the dust-discharging flow channel is outside the fan housing and connected with the dust-discharging hole.

14. The electronic device according to claim 13, wherein the centrifugal fan module further includes an air guiding structure, the air guiding structure is outside the fan housing and connected with the sidewall, and the dust-discharging flow channel is formed between the air guiding structure and the sidewall.

* * * * *